(12) United States Patent
Preiss

(10) Patent No.: US 6,622,807 B2
(45) Date of Patent: Sep. 23, 2003

(54) COOLING AIR SYSTEM FOR MOTOR VEHICLES AND METHOD OF MAKING AND USING SAME

(75) Inventor: Michael Preiss, Vaihingen (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/965,853

(22) Filed: Oct. 1, 2001

(65) Prior Publication Data

US 2002/0038634 A1 Apr. 4, 2002

(30) Foreign Application Priority Data

Sep. 30, 2000 (DE) .......................... 100 48 531

(51) Int. Cl.⁷ .............................. B60K 11/00
(52) U.S. Cl. ....................... 180/68.1; 165/44
(58) Field of Search ................ 180/68.1, 68.2, 180/68.3, 68.4, 68.6; 123/41.01, 41.31, 41.48, 41.49, 41.7, 198 E; 165/41, 121, 122, 126, 44

(56) References Cited

U.S. PATENT DOCUMENTS

| | | | | |
|---|---|---|---|---|
| 1,979,191 A | * | 10/1934 | Burney ...................... | 180/68.1 |
| 4,114,714 A | * | 9/1978 | Fachbach et al. .......... | 180/68.1 |
| 4,226,217 A | * | 10/1980 | Haslbeck et al. ......... | 123/41.62 |
| 4,706,615 A | * | 11/1987 | Scadding ................. | 123/41.01 |
| 4,756,279 A | * | 7/1988 | Temmesfeld ............. | 123/41.04 |
| 4,924,826 A | * | 5/1990 | Vinson .................... | 123/195 C |
| 5,526,872 A | * | 6/1996 | Gielda et al. | |
| 5,626,185 A | * | 5/1997 | Gielda et al. .................. | 165/41 |
| 5,724,925 A | * | 3/1998 | Ito ........................... | 123/41.49 |
| 6,390,217 B1 | * | 5/2002 | O'Brien et al. ............ | 180/68.6 |

FOREIGN PATENT DOCUMENTS

| | | | |
|---|---|---|---|
| DE | 3150152 | | 6/1983 |
| DE | 3403156 | * | 8/1985 |
| DE | 3704145 | | 8/1988 |
| DE | 4343593 | * | 7/1993 |
| DE | 19705268 | | 8/1998 |
| GB | 2117721 | * | 10/1983 |
| JP | 5169986 | * | 7/1993 |

* cited by examiner

Primary Examiner—Brian L. Johnson
Assistant Examiner—Bryan Fischmann
(74) Attorney, Agent, or Firm—Crowell & Moring LLP

(57) ABSTRACT

A cooling air system for motor vehicles has a radiator that is arranged in a front-end area of a motor vehicle and through which a cooling air stream flows. The exhaust air stream exiting from the radiator is directed beneath the motor vehicle by outlets that are arranged on the bottom of the motor vehicle. The outlets can be covered by an air guide element. In order to create a cooling air system for motor vehicles that has a simple design and simultaneously ensures favorable guidance of the cooling air, in the case of a motor vehicle whose outlets for cooling air can be covered by an air guide element, to arrange the air guide element in such a way that the exhaust air stream flowing out of the air guide element is directed basically parallel to one of the air streams flowing around the front end of the car.

12 Claims, 3 Drawing Sheets

COOLING AIR SYSTEM FOR MOTOR VEHICLES AND METHOD OF MAKING AND USING SAME

BACKGROUND AND SUMMARY OF THE INVENTION

This application claims the priority of German application 100 48 531.6, filed Sep. 30, 2000.

The invention relates to a cooling air system for motor vehicles and methods of making and using same. Preferred embodiments of the invention relate to a cooling air system for motor vehicles with a radiator that is arranged in a front end area of a motor vehicle and through which a cooling air stream flows, wherein the exhaust air stream exiting from the radiator is directed beneath the motor vehicle by outlets that are arranged on a vehicle bottom behind the radiator and the outlets are covered by an air guide element.

From German Patent Document DE 37 04 145 C2 we already know of a cooling air system for motor vehicles where an air stream flows through a radiator that is arranged in the front end of the motor vehicle. The air stream exiting from the radiator is guided through the engine compartment and directed downward out of the engine compartment in front of a headboard through openings. Additional inlet ports for allowing cooling air into the engine compartment are provided downstream of the radiator in the bottom. The heated air stream exiting from the radiator thus feeds the entire engine compartment; cooling air exits on the bottom of the motor vehicle in a non-directional manner.

German Patent Document DE 31 50 152 A1 depicts a motor vehicle where an air stream flows through a radiator that is arranged in the front end of the motor vehicle. The air stream is directed out of the engine compartment through an outlet in the bottom before the internal combustion engine. A spoiler is arranged on the bottom of the motor vehicle in an articulating manner so as to close the outlet in one of its end positions. The spoiler can be moved by a drive device independent of the coolant temperature and the driving speed.

Compared to the state of the art, a task of the invention includes creating a cooling air system for motor vehicles that has a simple design and at the same time ensures favorable guidance of the cooling air.

This task is resolved with the preferred embodiment of the invention by providing a cooling air system for motor vehicles with a radiator that is arranged in a front end area of a motor vehicle and through which a cooling air stream flows, wherein an exhaust air stream exiting from the radiator is directed beneath the motor vehicle by outlets that are arranged on a vehicle bottom behind the radiator and the outlets are covered by an air guide element, wherein the air guide element diverts the exhaust air stream in such a way that the exhaust air stream is directed basically parallel to an undercurrent that flows under the vehicle bottom and the air guide element.

According to the invention, in the case of a motor vehicle whose outlets for cooling air are covered by an air guide element, it is suggested to arrange the air guide element in such a way that the exhaust air stream flowing out of the air guide element is directed basically parallel to one of the air streams flowing under the front end of the car.

A beneficial embodiment of the invention furthermore can provide for the air guide element to consist of a guiding surface and side elements, wherein the side elements consist of an elastic material and the guiding surface is fastened to the bottom of the motor vehicle in a movable manner.

The invention also relates to methods of using and making the cooling air systems referred to herein. Other objects, advantages and novel features of the present invention will become apparent from the following detailed description of the invention when considered in conjunction with the accompanying drawings.

DETAILED DESCRIPTION OF THE PREFERRED EMBODIMENT

Figures 1, 2:
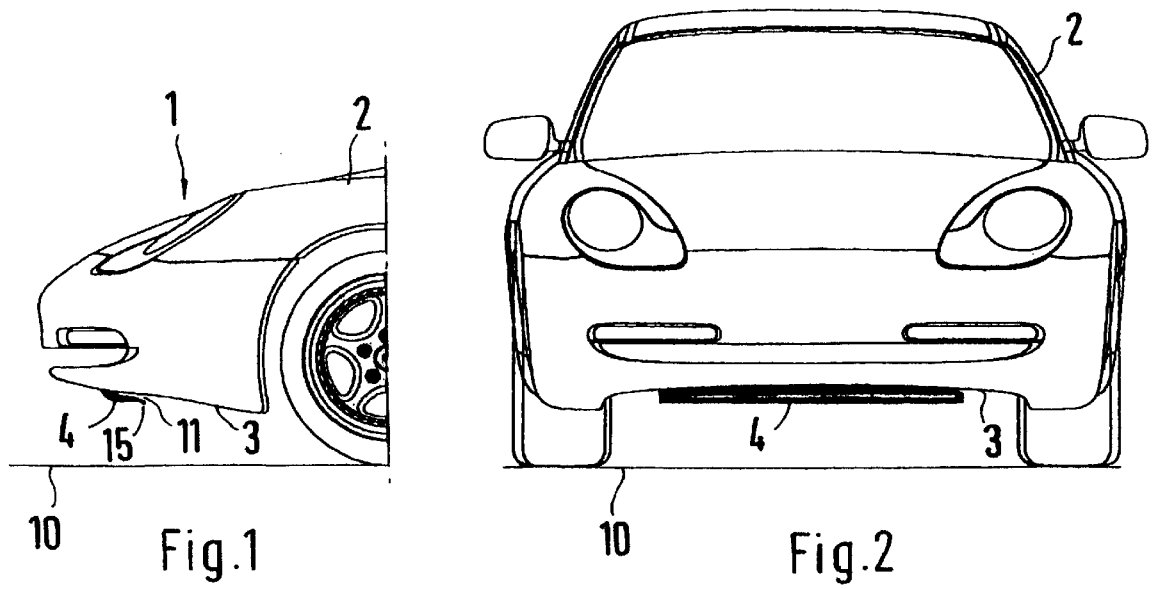
FIG. 1 is a side schematic view of a front end area of a motor vehicle with an air guide element constructed according to a preferred embodiment of the invention.
FIG. 2 is a front schematic view of the FIG. 1 arrangement.

In the front end area 1 of a motor vehicle 2 depicted in FIG. 1 and FIG. 2, an air guide element 4 is arranged in the bottom area 3 in the center of the motor vehicle 2.

Figure 3:
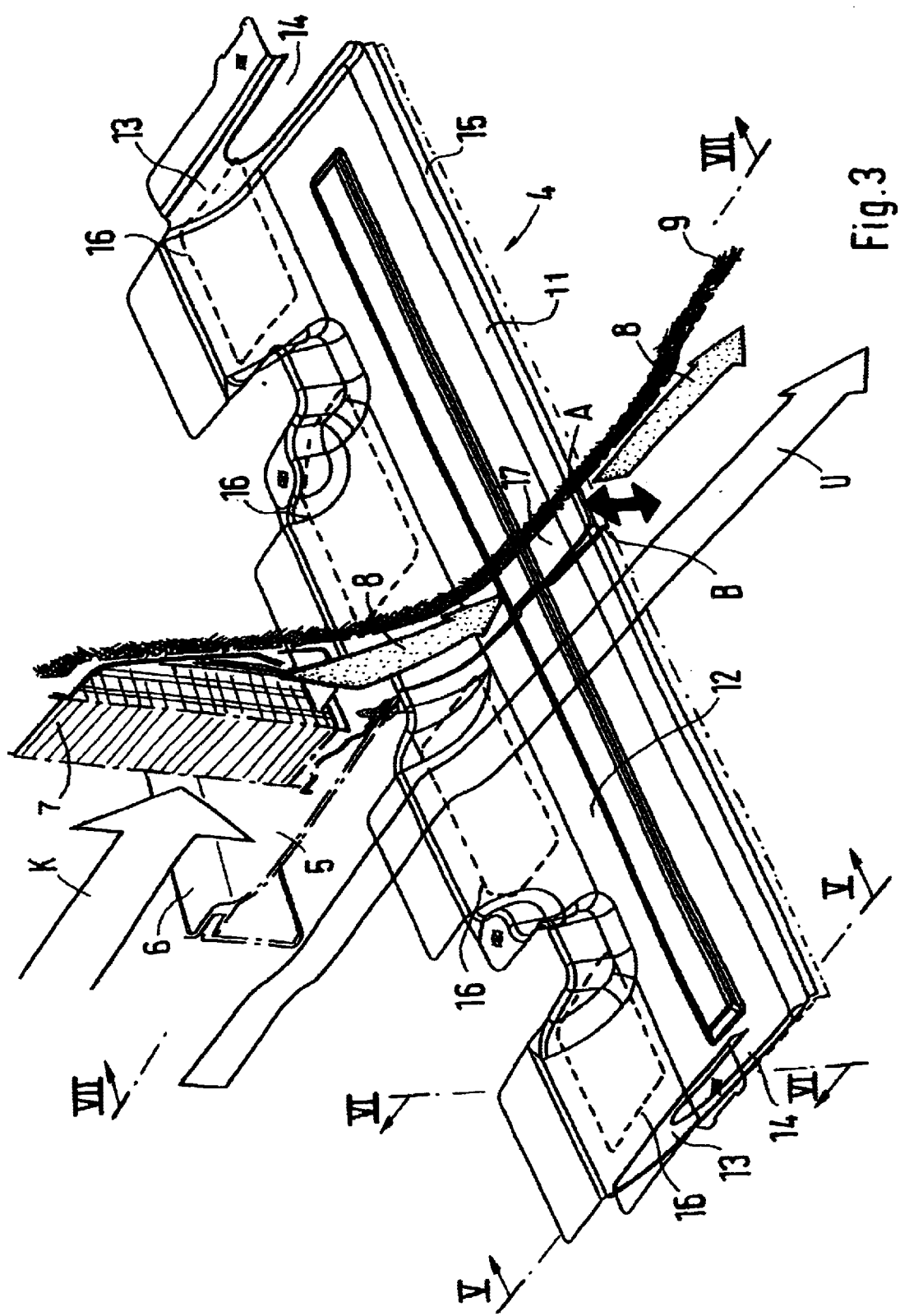
FIG. 3 is a sketch showing the streams on the air guide element.
Figure 6:
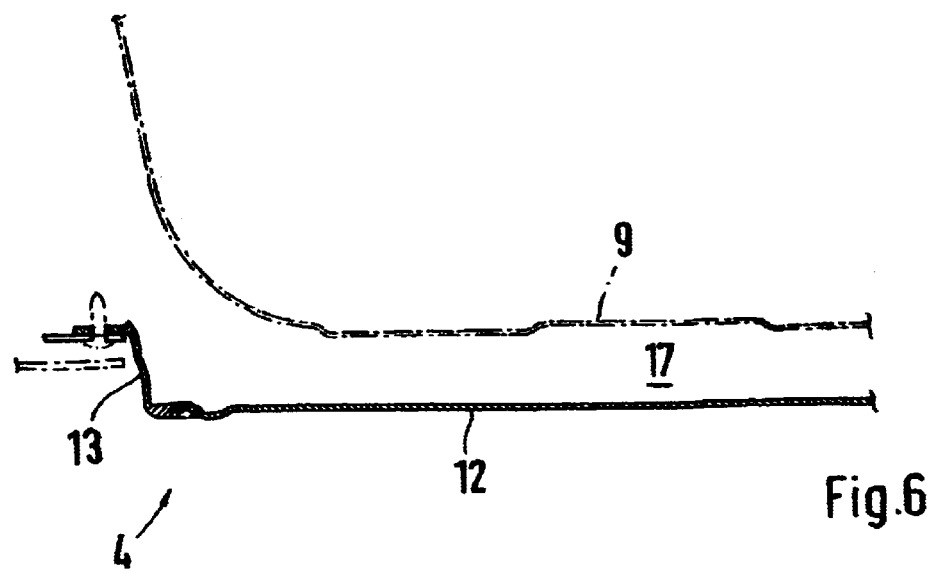
FIG. 6 is a sectional view taken along line VI–VI of FIG. 3.
Figure 7:
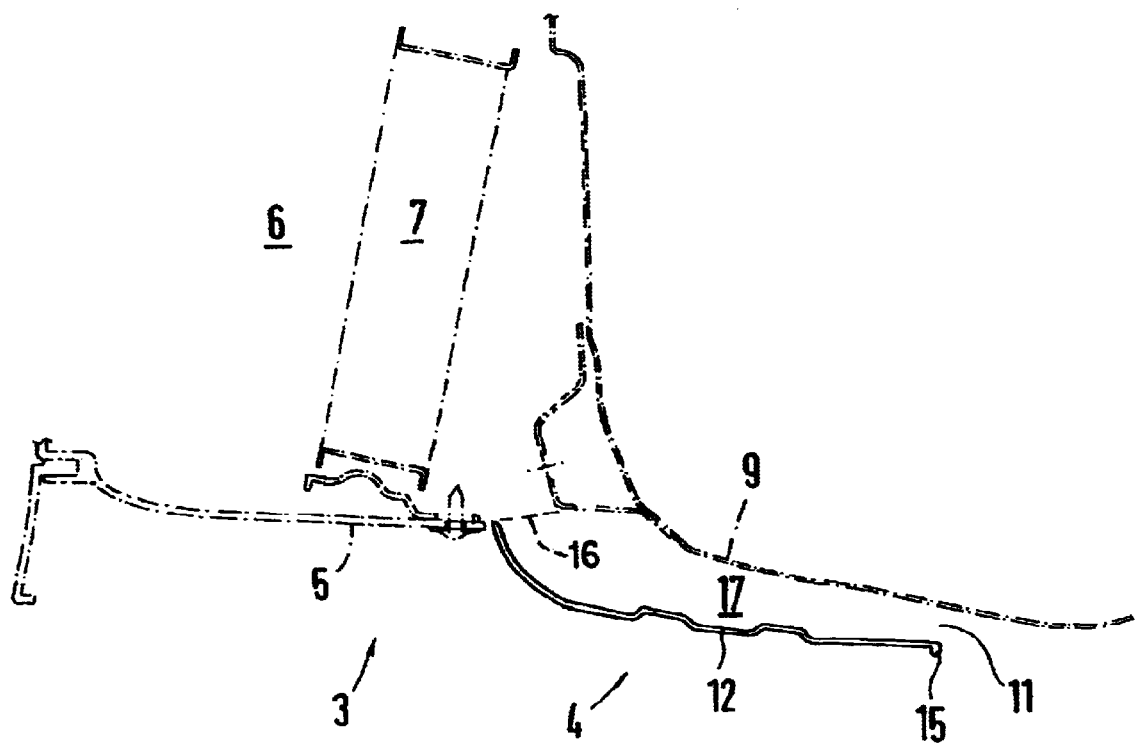
FIG. 7 is a sectional view taken along line VII–VII of FIG. 3.

FIG. 3 shows the installed version of the air guide element 4. The air guide element 4 is fastened to the floor panel 5 of the motor vehicle 2, which forms the front of the bottom area 3. Outlets 16 for cooling air are incorporated in the floor panel 5 and arranged between the floor panel 5 and the second floor panel 9. A cooling air stream K is directed through a radiator 7 in a cooling air duct 6 that is bordered from underneath by the floor panel 5. The heated exhaust air stream 8 exiting from the radiator 7 is directed downward by a second floor panel 9, wherein the second floor panel 9 extends upward in the area of the radiator 7 to the upper edge of said radiator and thus forms an upper boundary of a duct 17 for the cooling exhaust air stream 8.

When driving the motor vehicle 2, an undercurrent U forms between the bottom 3 of the motor vehicle 2 and the pavement 10 (see FIG. 1), which runs basically parallel to the pavement 10. An outlet 11 of the air guide element 4 is formed between the second floor panel 9 and an edge 15 of the air guide element 4. The air guide element 4 directs the cooling exhaust air stream 8 in such a way that it exits from the outlet 11 largely parallel to the undercurrent U.

Figure 4:
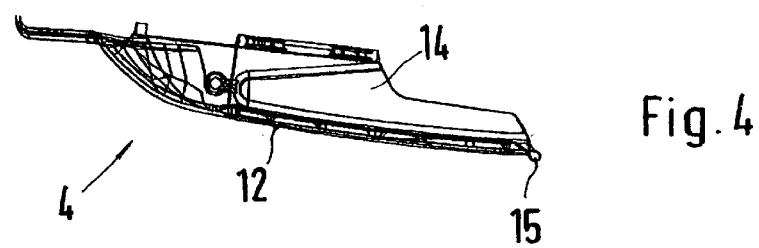
FIG. 4 is a side view of the air guide element of the FIG. 1 arrangement.
Figure 5:
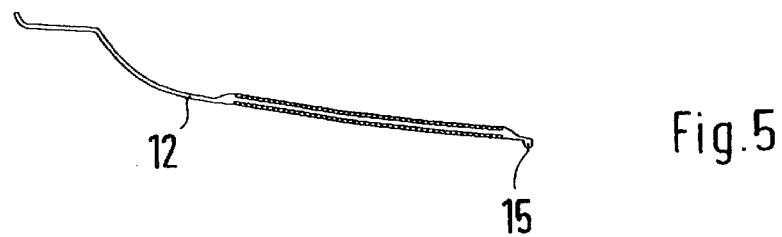
FIG. 5 is a sectional view taken along line V–V of FIG. 3.

The air guide element 4 comprises a guiding surface 12 and side elements 13. The guiding surface 12 has an arched design in its front area, which is fastened to one end of the floor panel 5, and then transitions into a sheet-shaped area, which ends at the edge 15. The side elements 13 cover the gap between the floor panel 5 and the guiding surface 12, with the gap being formed crosswise to the cooling exhaust air stream 8. The guiding surface 12 is dimensionally stable, with elastic deflection of the guiding surface 12 being possible crosswise to the flow direction of the cooling air stream 8, i.e. vertical to the undercurrent U, due to its thickness. The side elements 13 preferably consist of an elastic material and are elastic. Slits 14 (see FIG. 4) provided in the side elements 13 additionally support the elasticity of the side elements 13. Overall, the guiding surface 12 is therefore held on the bottom 3 of the motor vehicle 2 in a movably deflectable manner.

The edge 15 of the guiding surface 12 assumes the resting position marked with A when the vehicle does not move. Its distance to the pavement 10 has such a dimension that the front end 1 of the motor vehicle 2 does not touch the ground during normal driving, even on slopes. At high driving speeds, however, negative pressure is generated in the area of the bottom 3 due to the undercurrent U, affecting the guiding surface 12 and moving it downward. This causes the edge 15 to assume its second position B. This is accomplished by the expansion of the flexible side elements 13 on one hand and the deflection of the guiding surface 12 in the direction of the undercurrent U on the other hand. In position B, the outlet 11 is enlarged so that an increased cooling exhaust air stream 8 is possible. The reduced distance of the edge 15 to the pavement in position B does not cause any problems because we can assume that high driving speeds occur on level payment 10.

The invention also relates to a method of using the above-described system, including driving a vehicle equipped with this system with diversion of the exhaust air stream exiting from the vehicle radiator by said air guide element.

The invention also relates to a method of making an air guide element as described above, said method including forming the air guide element with a bottom and with lateral side walls configured to permit elastic bending of the air guide element during high speed driving with air flow under the guide element acting to cause downward deflection of rearward end portions of the air guide element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cooling air system for a motor vehicle with a radiator that is arranged in a front end area of a motor vehicle and through which a cooling air stream flows, wherein an exhaust air stream exiting from the radiator is directed beneath the motor vehicle by outlets that are arranged on a bottom area behind the radiator and the outlets are covered by an air guide element, when viewed from beneath the vehicle wherein the air guide element is configured to divert the exhaust air stream in such a way that the exhaust air stream is directed basically parallel to an air stream that flows under the vehicle bottom and the air guide element, and wherein the air guide element comprises a guiding surface and side elements, wherein the side elements consist of elastic material and the guiding surface is fastened to the bottom area of the motor vehicle in a movable manner.

2. Cooling air system in accordance with claim 1, wherein the side elements are equipped with slits.

3. A method of operating a vehicle with a cooling air system according to claim 2, comprising driving the vehicle with diversion of the exhaust air stream exiting from the vehicle radiator by said air guide element.

4. A method of operating a vehicle with a cooling air system according to claim 1, comprising driving the vehicle with diversion of the exhaust air stream exiting from the vehicle radiator by said air guide element.

5. An air guide element disposed in use on a motor vehicle which has a front end area radiator through which cooling air flows and exits through the radiator and is then directed as an exhaust air stream beneath the vehicle via outlets which in use are covered by the air guide element, when viewed from beneath the vehicle wherein the air guide element is configured to divert the exhaust air stream in such a way that the exhaust air stream is directed basically parallel to an air stream that flows beneath the vehicle under the air guide element, and wherein the air guide element comprises a guiding surface and side elements, wherein the side elements consist of elastic material and the guiding surface is fastened to the bottom area of the motor vehicle in a movable manner.

6. An air guide element according to claim 5, wherein the side elements are equipped with slits.

7. A method of making an air guide element disposed in use on a motor vehicle which has a front end area radiator through which cooling air flows through the radiator and is then directed beneath the vehicle via outlets which in use are covered by the air guide element, when viewed from beneath the vehicle wherein the air guide element is configured to divert the exhaust air stream in such a way that the exhaust air stream is directed basically parallel to an air stream that flows beneath the vehicle and the air guide elements, said method comprising forming the air guide element with a bottom and with lateral side walls configured to permit elastic bending of the air guide element during high speed driving with air flow under the guide element acting to cause downward deflection of rearward end portions of the air guide element.

8. A method of making an air guide element according to claim 7, wherein the air guide element comprises a guiding surface and side elements, wherein the side elements consist of elastic material and the guiding surface is fastened to the motor vehicle in a movably deflectable manner.

9. A method of making an air guide element according to claim 8, wherein the side elements are equipped with slits.

10. A vehicle assembly comprising:

a vehicle body having a radiator disposed in a front end thereof, a first floor panel forming radiator air openings at a rear end for accepting exhaust air from the radiator, a second floor panel disposed above the first floor panel and extending downwardly from a top rear part of the radiator to form a radiator exhaust air passage together with the first floor panel, and an air guide element facing the radiator air openings under the first floor panel and being configured to direct the exhaust air, wherein the air guide element diverts the exhaust air stream in such a way that the exhaust air stream is directed basically parallel to an air stream that flows beneath the vehicle.

11. A vehicle assembly according to claim 10, wherein the air guide element comprises a guiding surface and side elements, wherein the side elements consist of elastic material and the guiding surface is fastened to the motor vehicle in a movably deflectable manner.

12. A vehicle assembly according to claim 11, wherein the side elements are equipped with slits.

* * * * *